United States Patent [19]
Causa et al.

[11] Patent Number: 5,576,104
[45] Date of Patent: Nov. 19, 1996

[54] ELASTOMERS CONTAINING PARTIALLY ORIENTED REINFORCING FIBERS, TIRES MADE USING SAID ELASTOMERS, AND A METHOD THEREFOR

[75] Inventors: Alfredo G. Causa, Akron; Christina H. Obermaier, Stow; Marc Borowczak, N. Canton, all of Ohio

[73] Assignee: The Goodyear Tire & Rubber Company, Akron, Ohio

[21] Appl. No.: 269,744

[22] Filed: Jul. 1, 1994

[51] Int. Cl.$^6$ ....................................................... B60C 5/00
[52] U.S. Cl. .................... 428/382; 428/105; 428/113; 428/229; 428/265; 428/267; 428/288; 428/357; 428/359; 428/367; 428/372; 428/392; 428/395; 428/401; 152/450; 152/458
[58] Field of Search ........................ 152/458, 450; 428/288, 105, 113, 229, 265, 267, 357, 359, 367, 372, 382, 392, 395, 401

[56] References Cited

U.S. PATENT DOCUMENTS

| | | | |
|---|---|---|---|
| 4,514,541 | 4/1985 | Francis | 524/514 |
| 5,225,457 | 7/1993 | Borowczak et al. | 523/220 |

OTHER PUBLICATIONS

Tensil Strength and Ultimate Elongation of Rubber–Fibrous Compositions, VV Moshev, 1980 Gordon & Breach Sci. Publ.
Introduction to Rubber Compounding, Robert W. Layer, The Vanderbilt Rubber Handbook 1990.
Short Fiber Reinforced Elastomers, Rubber Chem. & Tech. 1983, pp. 619–638.
Effects of Matrix Characteristics in the Processing of Short Fiber Comp., J C Seferis/L. Nicolais, Plenum Publ. Corp. 1983, pp. 289–318, L. A. Goettler.
Short Fiber Reinforced Hose—a New Concept in Production and Performance, Rubber Chem & Tech. 52, No. 4 Sep./Oct. 1979 pp. 838–863, L. A. Goettler, R. I. Leib and A. J. Lambright.
Extrusion of Fiber–Reinforced Polymer Systems, Encyclopedia of Materials Sci & Engr., M. B. Ever, Pergamon Press 1086, pp. 1599–1600. L. A. Goettler.
Short Fiber–Rubber Composites, Handbook of Elastomers, New Developments and Tech., A. K. Bhowmick & H. L. Stephens, Marcel Dekker, Inc 1988 Ch 7 pp. 215–248, L. A. Goettler.
Short Fiber Reinforcement of Extruded Profiles, Rubber World, Oct 1982, pp. 33–42, L. A. Goettler, J. A. Sezna and P. J. DiMauro.
Elastomer Reinforcement with Short Kevlar Aramid Fiber for Wear Applications, Rubber World Oct. 1987, K. R. Watson and A. Frances.
Kevlar Short Fiber Reinforcement of Elastomers Matrices, Internationale Kautschuk–Tagung, 24, No. 27, Jun. 1991 pp. 41–44, Th. F. Schuller.

*Primary Examiner*—Patrick Ryan
*Assistant Examiner*—Rich Weisberger
*Attorney, Agent, or Firm*—David E. Wheeler

[57] ABSTRACT

Partially oriented yarns (POY), when processed into short fibers and used as a fiber reinforcement in an elastomer, have been found to demonstrate reduced crack propagation in the elastomer. POY reinforced elastomers can be used in tires to replace cord reinforced components, and for example, can be used in the tread base of a tire, obviating the need for an overlay ply. In one embodiment it has been found that the properties of a fiber reinforced elastomer can be optimized by using a mixture of partially oriented fibers and fibrillated pulp fibers, such as pulped high modulus rigid rod liquid crystalline fibers, as the fiber reinforcement.

14 Claims, 11 Drawing Sheets

ELASTOMERS CONTAINING PARTIALLY ORIENTED REINFORCING FIBERS, TIRES MADE USING SAID ELASTOMERS, AND A METHOD THEREFOR

BACKGROUND OF THE INVENTION

The present invention relates to fiber reinforced elastomers, and tires made using fiber reinforced elastomers.

In general, the presence of short fibers in a cured rubber compound results in an increase in initial or low strain (low elongation) modulus (stiffness). Concomitantly, the presence of short fibers in the rubber often times results in reduced fatigue endurance and in higher hysteretic heat build-up under periodic stresses.

Since the rubber in a rolling tire undergoes periodic deformations, for example, it is desirable that the fatigue fracture properties of a short fiber reinforced composite, used for such a purpose, be at least equal to those of the unreinforced rubber matrix.

Various discontinuous short fibers have been used to enhance stiffness (modulus) of rubber vulcanizates. For example, discontinuous cellulose fibers have been used as dispersions in rubber as disclosed in U.S. Pat. Nos. 3,697,364, 3,802,478 and 4,236,563. Other discontinuous fibers have been suggested or used such as, for example, aromatic polyamides (aramids), aliphatic polyamides (nylon), cotton, rayon, polyester, glass, carbon and steel.

Many of the polymeric fibers used in the tire art are known as fully or highly oriented short fibers. Elastomers reinforced with short fibers, for example Kevlar® pulp, demonstrate good stiffness. As the loading of Kevlar® pulp in an elastomer increases, the stiffness of the composite increases, however, the crack growth resistance decreases. Consequently, for some applications, it may not be possible to obtain a suitable balance between stiffness and crack growth resistance in an elastomer by using only fully or highly oriented short fibers.

International patent application WO 90/04617 to Allied Signal Inc. teaches the preparation of partially oriented yarns (POY short fibers) and discloses that such short fibers can be used in tires. The application does not teach that such fibers can be used in a tread base, or the specific properties desired for such use, or the fiber loading required.

Normally, where discontinuous fibers are used, the rubber composite also contains a particulate reinforcement in combination therewith.

In accordance with the invention, it is proposed that short fiber reinforced components can replace conventional components in a tire. For example, it is known in the prior art to provide an overlay ply in the crown area of tires that are subjected to high speeds. It is proposed in accordance with one embodiment of the present invention, to eliminate the need for prior art overlay fabric by using a short fiber reinforced rubber layer as the tread base, which may be calendered, or alternatively, co-extruded with the tread rubber. Co-extrusion of such material will reduce the labor required to build a tire.

Accordingly, it is an object of the present invention to provide means for reinforcing an elastomer matrix whereby a good balance of desired properties in the elastomer matrix is obtained at a minimum cost.

A tire made using the reinforced matrix of the invention is also disclosed.

Other objects of the invention will be apparent from the following description and claims.

SUMMARY OF THE INVENTION

A tire component for a pneumatic tire comprising a reinforced vulcanizable composition is provided. In the illustrated embodiment, a tread base composition is described. The composition comprises a vulcanizable elastomeric matrix material having dispersed therein an effective reinforcing amount of partially oriented fibers having a modulus of less than 10 GPa, preferably less than 6 GPa. The partially oriented fibers are from about 0.2 to 12 mm long, have a diameter of about 0.005 to 0.03 mm, have an aspect ratio of about 25 to 1000, and comprise about 1 to 14 parts by weight per 100 parts by weight (phr) of the vulcanizable elastomeric matrix material. The partially oriented fibers may comprise polyamides, polyesters, or polyolefins, and as specific examples a polymer selected from the group consisting of nylon 6, nylon 46, nylon 66, polyethylene, polypropylene, polyethyleneterephthalate (PET), polyethylene naphthalate (PEN), and mixtures thereof.

As an alternative embodiment, a tire component may be reinforced with a mixture of POY fibers and fibrillated pulp fibers.

Also provided is a composition comprising a vulcanizable elastomeric matrix material having dispersed therein an effective reinforcing amount of a mixture of partially oriented fibers and fibrillated pulp fibers.

The partially oriented fibers are as described above, and the fully oriented fibers may comprise a fiber in pulp form. In one embodiment, the pulp fibers comprise a trunk portion having a length of about 0.2 to 5 mm, a diameter of about 0.0005 to 0.02 mm and an aspect ratio of 25 to 1000, said fibers having a plurality of fibrils extending outwardly from said trunk, said fibers having a surface area of about 5 to 20 square meters per gram.

The partially oriented fibers comprise about 0.5 to 10 phr (parts by weight per 100 parts of by weight of vulcanizable matrix material), and the fully oriented fibers comprise about 0.5 to 8 phr, and the total of both kinds of fibers comprising a total of about 1–14 phr in the elastomeric material.

DETAILED DESCRIPTION OF THE INVENTION

Figure 1:
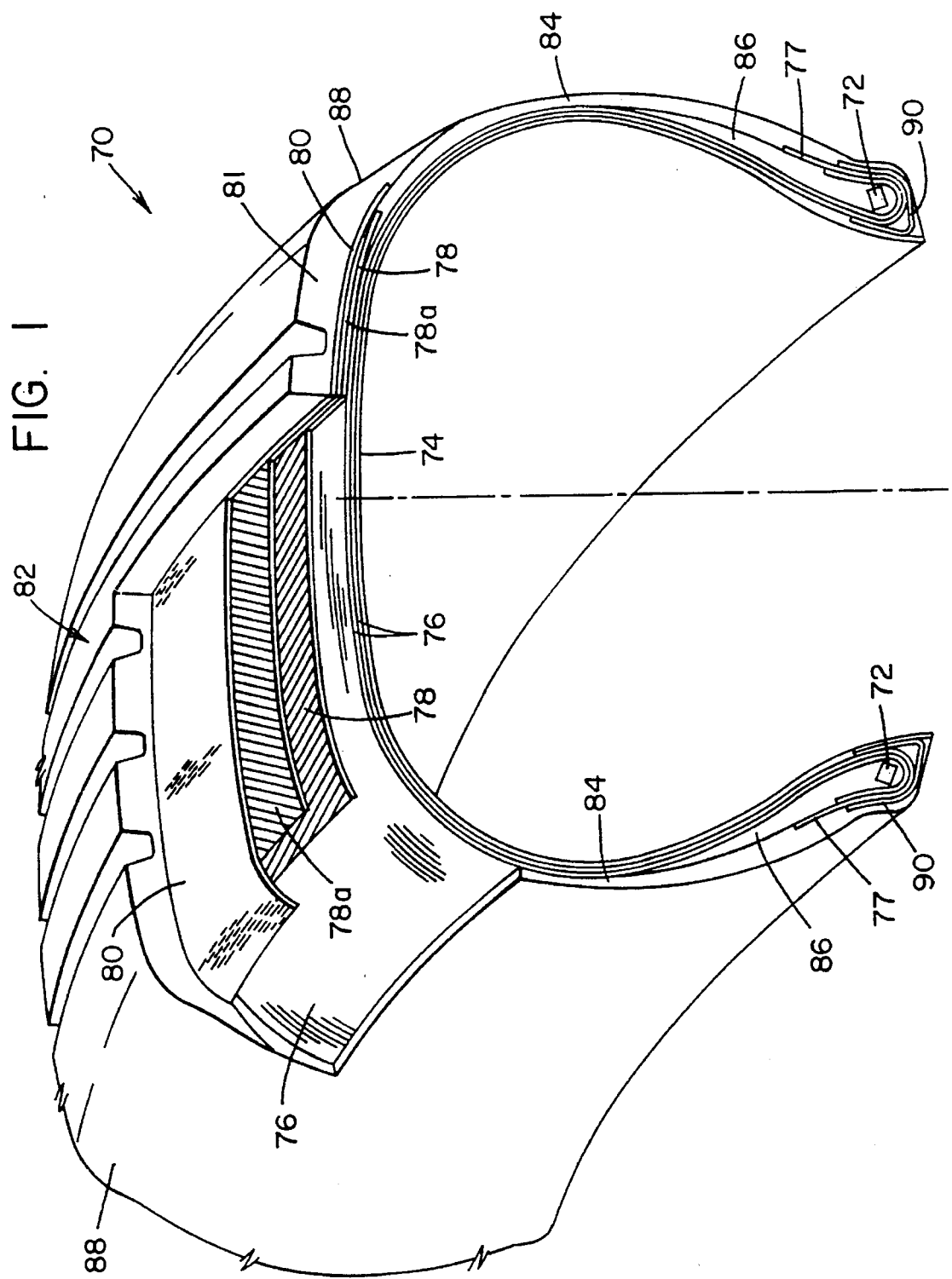
FIG. 1 illustrates a tire which can be made using the composites of the invention.

When a crack is formed in an elastomeric material, a stress concentration will develop at the tip of the advancing crack. There are some well-documented stress dissipation mechanisms that will slow down the rate of crack growth. For example, (a) certain elastomers, notably cis-1,4-polyisoprene (natural rubber), crystallize upon stretching (strain-induced crystallization). In the highly stressed zone at a crack tip, crystallization takes place even when the overall strain is relatively small, and the energy dissipation accompanying crystallization leads to greatly enhanced tear strength;

(b) particulate fillers, notably carbon black, increase the tear strength of amorphous elastomers to a remarkable degree. It is generally conceded that reinforcement by fillers is due to major deviation of the tear direction (knotty tear) augmented by an increase in viscous dissipation;

(c) energy dissipated as heat (hysteresis) will not be available to promote crack growth.

Fibrillated short fibers, such as Kevlar® pulp, or other highly crystalline, highly oriented, rigid-rod fiber-forming materials, will force a crack to follow a meandering or tortuous path and thereby provide an energy dissipation mechanism leading to an elastomer composite with improved crack growth resistance. At the same time, these materials will substantially increase the low strain modulus of the elastomer matrix.

Also, as compared to the elastomer, the hysteresis of the composite made using pulp fibers increases, and the resistance to fatigue, cut growth, and tearing increase.

In the conception of the invention, it was proposed to use a partially oriented fiber yarn (POY), or a hybrid combination of POY short fiber and fibrillated pulp in place of the fully oriented fibers used by the prior art.

It is believed that composites made using POY fibers exhibit improved cut growth properties because the POY fiber provides an additional means of dissipating energy when the POY fiber is stretched or oriented when the rubber matrix is distorted. Also, the low modulus of the POY fiber may cause a reduction of stress at the fiber/rubber interface.

POY fibers are made up of polymer chains having large disordered (or non-oriented) domains. When the fiber is subjected to elongational strain, the disordered domains can stretch (extend), in much the same way that an elastomer chain expands when subjected to a force, and therefore the fiber has a low tensile modulus and tensile strength but a high ultimate elongation. The POY fibers add almost as much to the stiffness of an elastomer as do fully oriented flexible chain fibers when incorporated into a composite, while absorbing energy as they stretch which would otherwise be available to the elastomer to contribute to fracture propagation.

POY short fibers, preferably POY nylon 66 or nylon 6, will provide a moderate increase of low strain modulus and a readily available mechanism of energy dissipation upon deformation due to an increased orientation in the molecular structure of the partially oriented fiber (strain induced crystallization).

Typically, an elastomer matrix containing POY fibers has nearly equal stiffness and lower cut growth rate, higher hysteresis, and similar hardness, tear strength, tensile strength and ultimate elongation properties as compared to an elastomer matrix which is reinforced with fully oriented flexible chain short fibers. Thus it is possible to achieve nearly the same increase in stiffness using POY fibers, in a composite, other properties being equal, as it is using standard fibers, while obtaining significant advantages in cut growth resistance.

A carbon black filled elastomer loaded with 1 to 10 phr partially oriented Nylon 6,6 short fibers may have a tensile modulus at 50% elongation of 0.8 MPa to 9 MPa when tested at room temperature and at a rate of 20 inches per minute. The cut growth rate may range from 2 to $8 \times 10^2$ mm/Mc tested at 30% strain cycle at a rate of 10 Hz and tested at room temperature. The hysteresis at these test conditions may range from 1.0 to $3.0 \times 10^2$ KPa. The tensile strength tested at the same conditions of such a carbon black filled elastomer may drop from 18.0 MPa down to 7.0 MPa by adding up to 10 phr of partially oriented Nylon 66 short fibers. The ultimate elongation may likewise decrease from 600% down to 300%. The room temperature Shore A hardness of such a composition may range from 50 to 70 points.

In contrast to a POY fiber, a fully oriented fiber, for example a rigid rod liquid crystalline fiber such as Kevlar®, contains a core of fully oriented polymer chains that are rigidly aligned. Accordingly, the fibers are substantially inextensible and when incorporated into a composite, cause the composite to be relatively more stiff (higher modulus) and to have more restricted extension (low elongation properties) as compared to composites made with POY fibers.

Improved compound reinforcement is obtained using a hybrid mixture of POY fibers and fibrillated pulp short fibers, which exhibits complementary energy dissipation mechanisms. In the illustrated embodiment the complementary energy mechanisms are crack deviation and high elongation energy associated with deformation.

The properties of a composite containing both partially oriented fibers and fully oriented liquid crystalline fibers, (a hybrid short fiber reinforced composite) depend on the amount of each fiber present and can vary over a broad range. Often, for a particular purpose, a hybrid composite has a better balance of properties than both the corresponding POY composite or the composite containing fibrillated pulp fibers.

To fully understand the mechanisms of fiber reinforcement, it is necessary to know the structure of the fibers and how they are made, particularly in terms of orientation of the polymer chains in the fiber.

The manufacture of a thermoplastic polymer such as polyester, nylon or polypropylene into a filament yarn requires spinning from a melt or a solution and also a process called orientation or drawing. In conventional polymer melts or solutions, the molecules are arranged in a random coiled configuration; if solidified in this state, the resulting material would not have the required tensile properties.

The most important stage of orientation occurs as the fiber is drawn down from the bulge produced at the spinneret opening. Solidification of the fiber also takes place during this process. The bulge is produced as the polymer molecules expand after having been released from the pressure in the spin pack. This orientation process is often called spin draw.

An additional type of drawing that may take place during fiber production is mechanical drawing.

The amount of the mechanical drawing varies considerably depending on the process used to produce the yarn. Nylon or polyester which is spun and solidified at speeds under 1500 meters per minute has very little spin orientation. Yarns of this type are known as undrawn yarn, unoriented yarn or low-oriented yarn. Most of the required draw is provided mechanically in a separate process, after spinning is completed, on a draw-twister at a draw ratio of about 5.0. One drawback is the short shelf life of the spun yarn since crystallization of the as-spun fibers occurs in the unoriented state while stored at room temperature.

In the modern spin/draw process, spinning and drawing are accomplished on the same machine at the same time, and the resulting yarn is called a fully oriented yarn. Spinning is performed at a speed of about 1500 meters per minute after which a mechanical draw of approximately 2.5 is performed. The keys to this process are high winding speed (3000 to 4000 meters per minute) and rapid heating techniques used to preheat the solidified fiber before mechanical drawing. The spin/draw process is widely used to produce polyamide, polyester and polypropylene filament fibers.

In the POY spinning process, the equipment used is very similar to the spin/draw process; the major difference is the elimination of the mechanical draw from the spinning machine. The winders still operate at speeds between 2500 and 4000 meters per minute; hence, the fibers are drawn from the spinneret at sufficient speed to provide enough spin orientation so that the spun fiber has stable properties with long shelf life. The spun fiber from this process is called partially-oriented yarn (POY), and because of its long shelf life, a variety of processes have been developed which utilize POY as a feed yarn.

Examples of fibers that may be partially oriented are polyamide, polyester and polyolefins.

Examples of specific fibers that can be partially oriented are nylon 6, nylon 46, nylon 66, polypropylene, polyethylene, polyethyleneterephthalate (PET) and polyethylenenaphthalate (PEN).

Conventional fibers such as polyamides, polyesters and polyolefins have a flexible molecular chain structure and tend to crystallize into folded-chain crystalline domains. Fully oriented, or strictly speaking highly oriented, extended-chain crystalline fibers can be prepared by spinning liquid crystalline melts or solutions of stiff-chain polymers, known respectively as thermotropic and lyotropic polymers. When spinning liquid crystalline (anisotropic) melts or solutions, only the spinning process is required and drawing is not necessary to obtain highly oriented fibers.

In the following paragraphs, we describe some typical liquid crystalline fibers that can be used in our invention.

1. Vectran® is a fiber spun from a liquid crystalline melt of a rigid, rodlike aromatic copolyester whose molecular structure is made up of two monomers, viz. p-hydroxybenzoic acid and 6-hydroxy-2 naphthoic acid, in a random sequence distribution, and in different molecular ratios. It is made by Hoechst-Celanese Corporation, USA, a wholly owned subsidiary of Hoechst, A. G., Germany.

2. Fibers spun from a liquid crystalline solution of a rigid, rodlike aromatic polyamide via the dry-jet (air-gap) wet spinning technique are produced commercially by E. I. dupont de Nemours & Co., Inc., USA under the tradename Kevlar®, and by Akzo Nobel Fibers, the Netherlands, under the tradename Twaron®. The chemical structure of these para-aramid (or p-aramid) fibers is poly (p-phenyleneterephthalamide).

3. Cellulosic fibers made by spinning liquid crystalline solutions of cellulose esters (formate or acetate) with subsequent saponification to yield regenerated cellulosic fibers. As in the case of aromatic polyamides, the rigid, rodlike cellulose macromolecules adopt, in suitable solvents, a more or less unfolded, chain-extended configuration. Spinning such solutions leads to the formation of highly oriented fibers in the "as-spun" state, without a mechanical post-drawing step.

4. Highly oriented, extended-chain crystalline fibers made from rigid-rod, aromatic heterocyclic polymers by a liquid crystalline solution spinning route. The best known examples of this class of fibers are poly (p-phenylenebenzobisthiazole) or PBZT, and poly (p-phenylenebenzobisoxazole), known as PBZO.

All of these highly oriented, stiff-chain polymer fibers will fibrillate to a pulp-type product under mechanical shear forces. In addition, a highly branched fibrillated, high surface area pulp, similar to cellulosic and aramid pulps, can also be produced from short wet-spun acrylic (polyacrylonitrile) filaments by commercial mechanical processes.

Highly oriented aramid fibers can also be prepared by conventional spinning of an isotropic solution of an aromatic copolyamide, followed by drawing of the spun fibers at very high temperatures and draw ratios. A fiber of this type, copoly (p-phenylene/3,4$^1$-oxydiphenyleneterephthalamide), is made commercially by Teijin, Ltd., Japan, under the tradename Technora®, and can be converted to a pulp that can be used in the hybrid reinforcement composites of our invention.

Highly-oriented, extended-chain crystalline fibers can also be produced from flexible chain polymers by the gel spinning technique. Examples of this type of fiber are polyvinylalcohol (PVA) fiber and some polyolefin fibers (e.g. polyethylene).

We note that all these fibers whether stiff or flexible chain, whether made by a liquid crystalline or a conventional solvent spinning process or via gel spinning, have one common characteristic, viz., a high degree of orientation. This ultra-high degree of orientation, and concomitant mechanical anisotropy, is the main microstructural feature responsible for the tendency of these fibers to undergo to a greater or lesser extent axial splitting and fibrillation under shear, yielding pulp-like products.

Although fiber orientation (crystalline and amorphous regions) can be calculated based on X-ray diffraction, birefringence and sonic modulus measurements, for the purpose of our invention it is better to characterize the fibers by their mechanical properties, viz., percent elongation at break (ultimate elongation), breaking strength, and most importantly, initial tensile modulus.

The highly oriented (ultra-high strength/ultrahigh modulus) fibers described in preceding paragraphs offer a very wide range of properties: tensile strength from 2.5 to 3.5 GPa; tensile modulus from 60 to 250 GPa and elongation at break from 2.2% to 4.6%.

The POY fibers used for our invention also exhibit a wide range of properties: initial tensile modulus (at 2% elongation) from 0.35 to 3.50 GPa, and ultimate elongation from 50% to 350%.

Composite compositions containing POY short fibers have been characterized in U.S. Pat. No. 5,225,457, issued Jul. 6, 1993, incorporated herein by reference. In the patent, it was shown that composites containing nylon-POY fibers had a higher Tc (catastrophic tearing energy) than composites containing fully oriented nylon fibers.

Also, it was shown that fracture properties of composites containing POY fibers were greatly improved as compared to composites containing fully oriented short fibers.

In a preferred embodiment of this invention, a Kevlar® pulp masterbatch and a POY nylon 66 short fiber, both produced by DuPont, are used.

The nylon 66 POY obtained from DuPont is made from 160 denier yarn, comprising 17 filaments in a round cross-section, having a tenacity of 1.65 gpd (grams per denier) (0.166 GPa) and elongation at break of 315%. The continuous filament is offered by DuPont as a commercial material for use as high elongation pick yarn; for the examples herein, the yarn was cut into ¼ inch fibers.

Kevlar® aramid pulp is a unique, engineered short fiber made by DuPont by a proprietary masterbatch process. Kevlar® fibers have a highly crystalline, oriented, fibrillar microstructure, and pulp products are made by fracturing this crystalline structure by masticating fibers, elastomer and fillers together. Consequently, pulp fibers are short and have many attached fibrils of various shapes, being sometimes curled, branched and often ribbon-like.

In one embodiment of the invention, an elastomer composition employing POY short fibers can be used as a component in a pneumatic tire. In the illustrated embodiment, such reinforcement is used in the tread base of a tire. The tread base composition comprises a vulcanizable elastomeric matrix material having dispersed therein an effective reinforcing amount, about 1–14 phr, preferably 4–8 phr of partially oriented fibers having a modulus of less than 10 GPa, preferably less than 6 GPa. The partially oriented fibers are from about 0.2 to 12 mm long, have a diameter of about 0.005 to 0.02 mm, and have an aspect ratio of about 25 to 1000). The POY fibers can be used in a tread base composition at a loading of about 1 to 14 phr, preferably 1–10 phr.

In an alternative embodiment, a tire component, for example a tread base, can be reinforced with a hybrid mixture of POY short fibers and fibrillated pulp fibers. In an elastomer matrix that can be used for such a purpose, 0.5 to 10 phr POY fibers and 0.5 to 8 phr pulp fibers can be used wherein the total loading of the two fibers is 1–14 phr. Preferably, the matrix will contain 1–8 phr POY fibers and 1–6 phr pulp fibers with a total fiber content of 2–10 phr.

Using a hybrid mixture of short fibers featuring complementary energy dissipation mechanisms, viz., crack deviation and high deformational energy, in the preparation of a composite structure, provides a hybrid short fiber reinforced composite which has an excellent balance of properties. Test data shows that a 3 phr Kevlar® pulp/3 phr POY nylon 66 hybrid composite increases the dynamic stiffness (elastic shear modulus) of the elastomer matrix and at the same time improves its crack propagation resistance.

Figure 8:
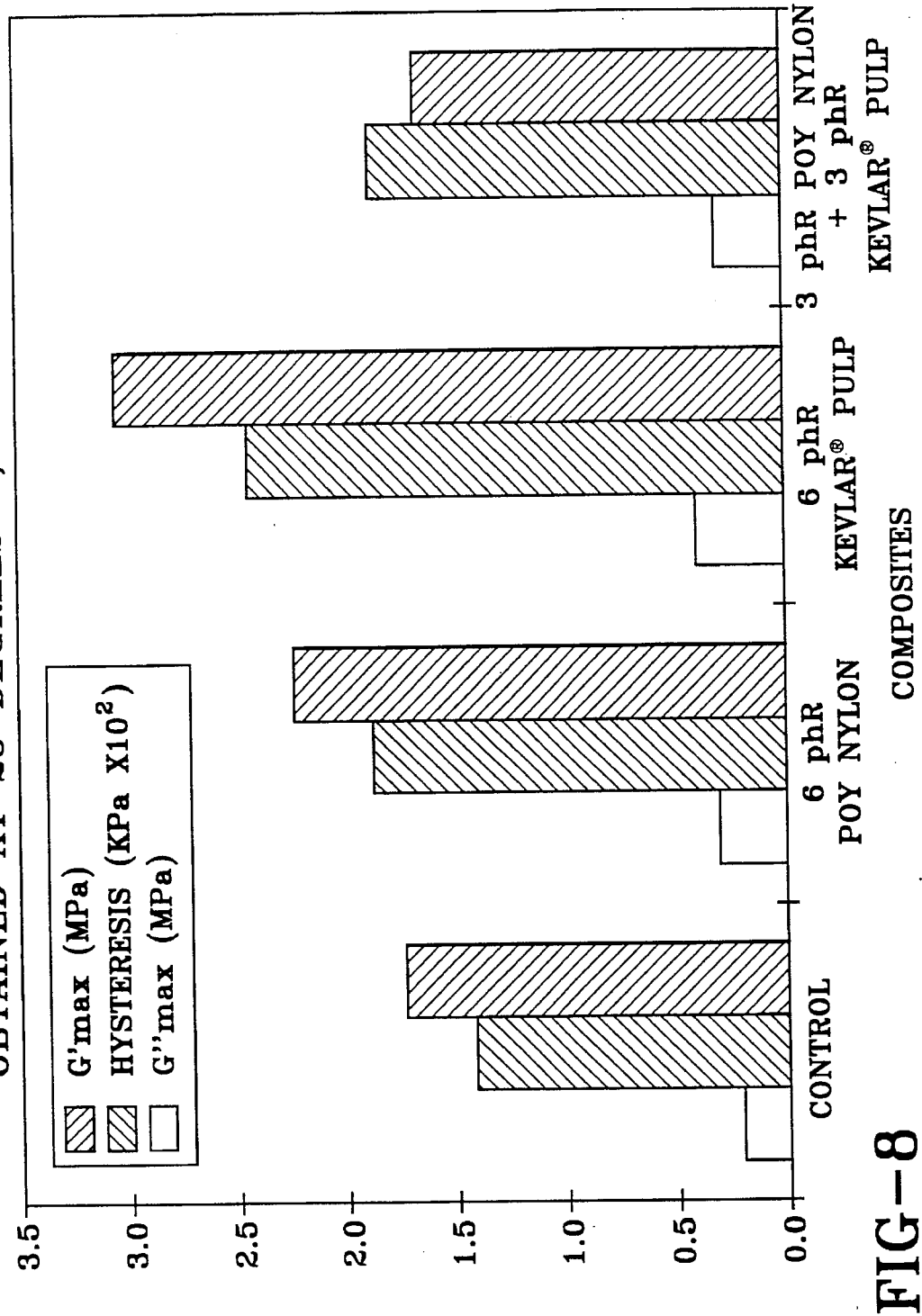
FIG. 8 illustrates low strain viscoelastic data for the composites illustrated in FIG. 6.
Figure 11:
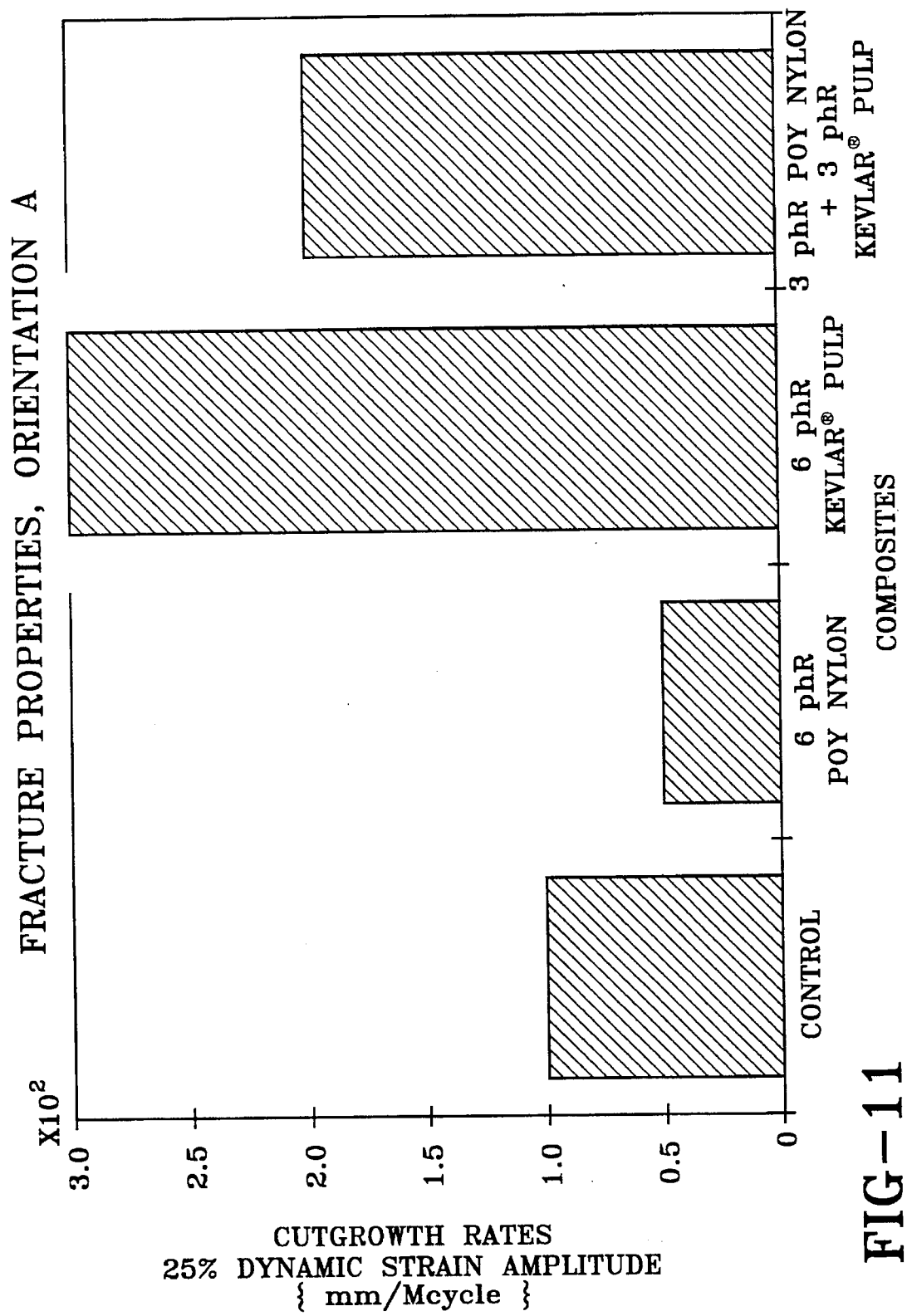
FIG. 11 illustrates the fracture properties of the composites of FIG. 6 (orientation A).

The aforementioned hybrid composite shows lower hysteresis at low dynamic strains and lower crack propagation rate at 25% dynamic strain "against the grain" than the all-Kevlar® reinforced composites (FIGS. 8, 11).

Figure 9:
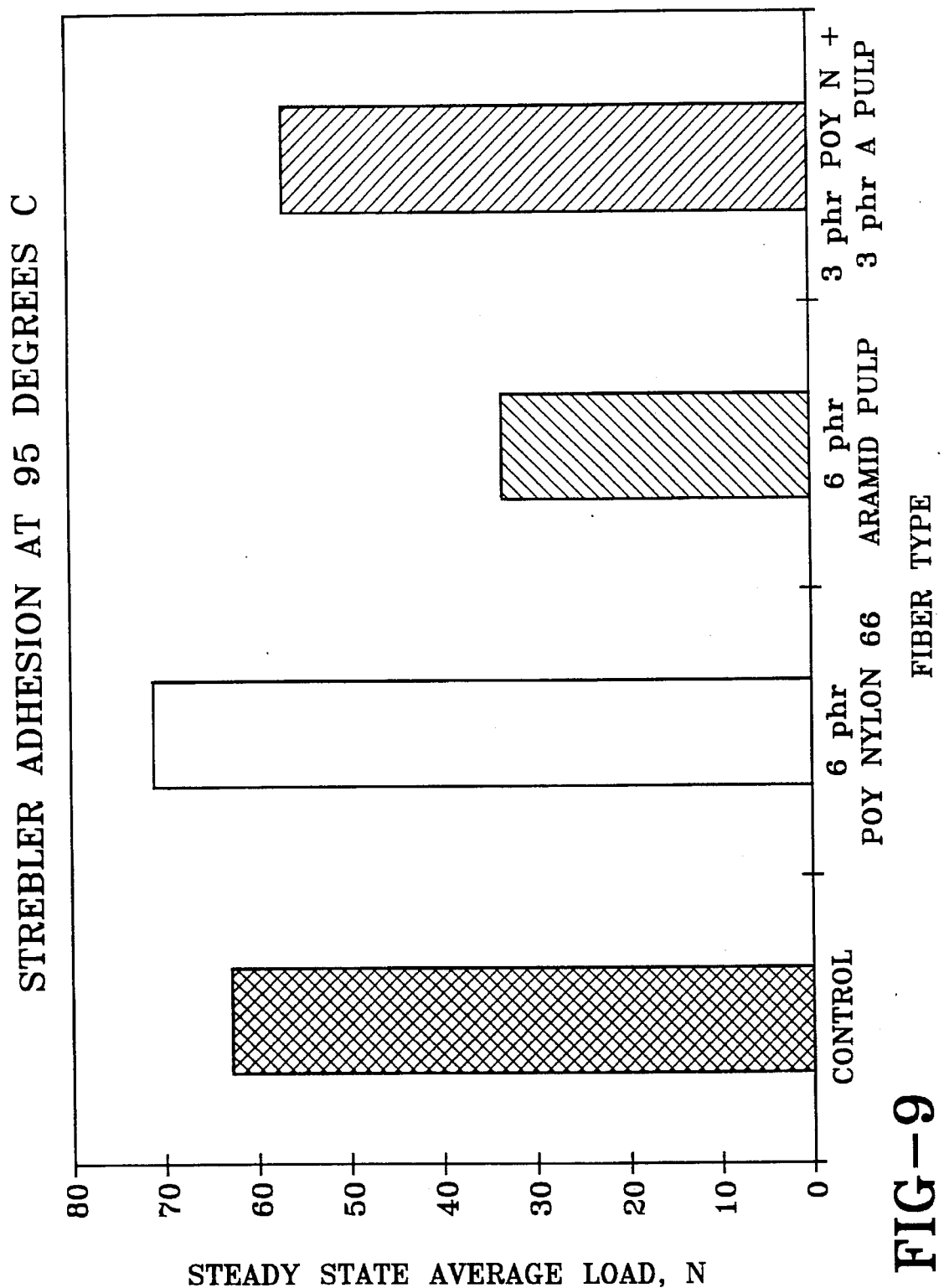
FIG. 9 illustrates The Strebler adhesion of the composites illustrated in FIG. 6.
Figure 10:
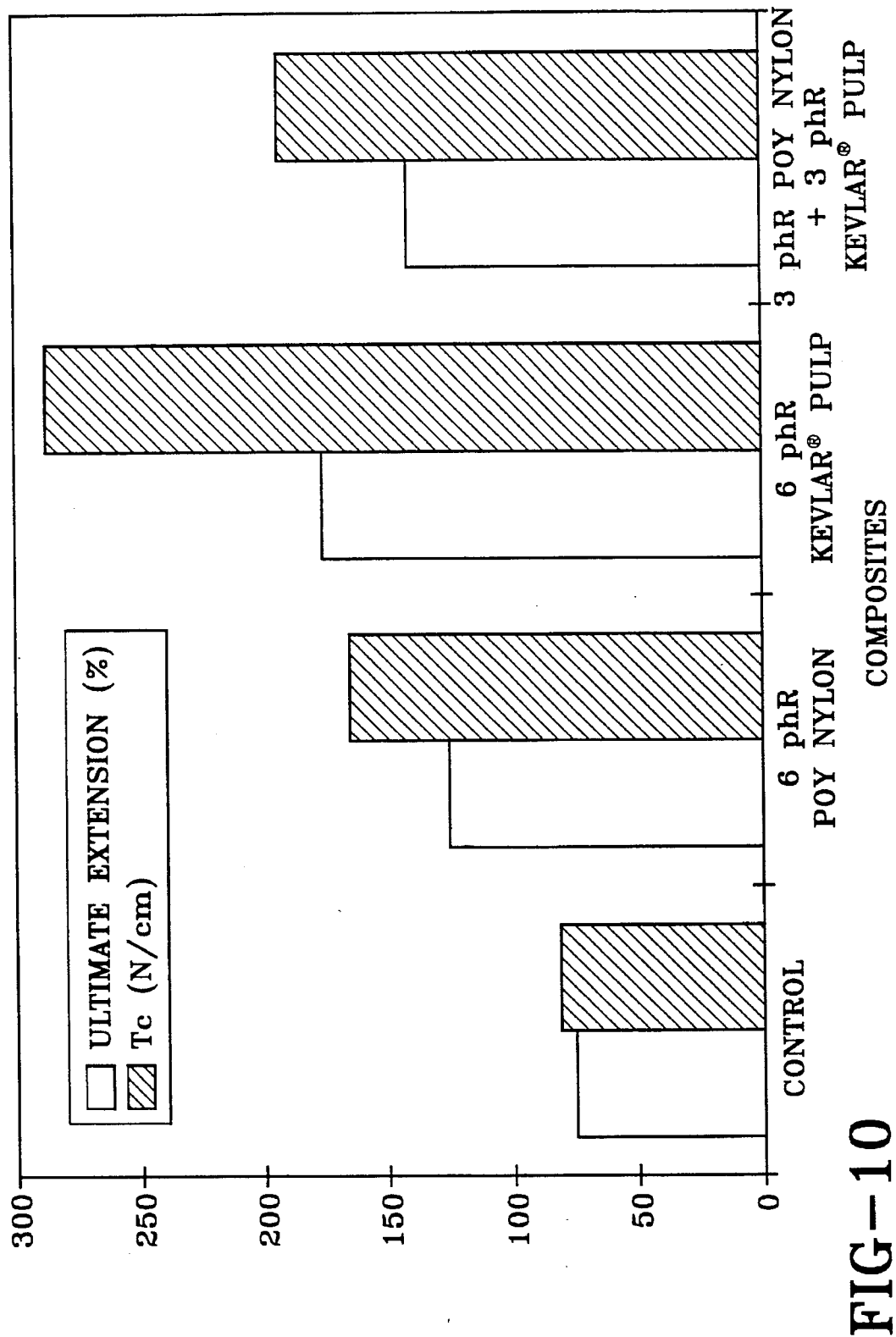
FIG. 10 illustrates the ultimate properties of the composites of FIG. 6.

In addition, the hybrid composite substantially enhances the catastrophic tearing energy and ultimate elongation of the elastomer matrix (FIGS. 9, 10). An elastomer tread base reinforced with 40 to 60 phr carbon black and 4 to 8 phr POY nylon short fiber has a tensile modulus at 50% elongation of 2.5 to 5.0 MPa, a cut growth rate of 4 to $6 \times 10^2$ mm/Mc, a hysteresis of 1.75 to $1.85 \times 10^2$ KPa, a tensile strength of about 11 to 15 MPa, an ultimate elongation of 400 to 600% and a Shore A hardness of about 53 to 68 points.

An elastomer tread base reinforced with 40 to 60 phr carbon black and 1 to 12 phr total fiber with 0.5 to 6 phr fibrillated fibers and 0.5 to 8 phr of POY fibers has a tensile modulus at 50% elongation of 1.0 to 7.0 MPa, a tensile strength of 9.0 to 15.0 MPa, an ultimate elongation of 300 to 600%, a Shore A hardness of 52 to 70, a cut growth rate of 1.0 to $10.0 \times 10^2$ mm/Mc, and a hysteresis of 1.5 to $3.0 \times 10^2$ KPa.

Other elastomers that can be used in the invention include, but are not limited to polyisoprene rubber (IR), styrene butadiene rubber (SBR), butyl and halobutyl rubbers (IIR, BIIR, CIIR), ethylene propylene rubbers (EPM, EPDM), crosslinked polyethylene (XLPE) and chloroprene rubbers (CR), nitrile rubbers (NBR), and mixtures thereof.

In a preferred embodiment, a fiber reinforced elastomer as described above may be co-extruded with other elastomeric components as a labor saving method to provide a composite article or a single (co-extruded) composite component of a larger composite article. It has been found that when a fiber loaded elastomer is co-extruded with a non-fiber containing elastomer, however, the extruder tends to deform the fiber loaded elastomer. It has been found that this problem can be controlled by proper design of the extruder, as has been characterized by L. A. Goettler in a number of publications. See for example "Short Fiber Reinforcement of Extruded Rubber Profiles", Rubber World October 1982.

A tread base (an elastomer composition disposed between the tread and the belt package) containing fiber reinforcement may be co-extruded with a tread cap to produce a tread package in a one-step operation. The tread base, as is usual in the art, preferably comprises the same rubber composition as the sidewalls of the tire. It has been found that because the tread base is fiber reinforced, in some embodiments the overlay ply can be eliminated, and the tread package can be applied to the tire directly over the belt package using prior art methods. In an illustrated embodiment, the fibers in the tread base are oriented at a substantially 0° angle with respect to the equatorial plane of the tire.

Other orientations of the short fibers are possible.

Similarly, a calender may be used to prepare a fiber reinforced elastomer sheet that can be applied directly over the belt package.

With reference now to FIG. 1, a tire 70 is illustrated which has been made with a fiber reinforced tread base 80 of the invention. The tread base 80 is incorporated in the tread 82 as it is co-extruded with the tread cap 81. The crown area of the tire may be further reinforced by belts or breakers 78,78a. The tire can be made as conventional in the art except that the overlay ply is omitted.

As is conventional in the art, the tire comprises a pair of beads 72 over which have been wrapped carcass plies 76. The turning-up of carcass plies 76 over beads 72 forms apex 86 between carcass 76 and turn up 77. When a tubeless tire is made, the tire will have an inner liner 74 disposed inwardly of carcass ply 76. Tire 70 may also have optional chafer 90. Sidewalls 84 meet tread 82 at shoulder 88 to substantially complete its construction.

It has been found that a tire made using a fiber loaded tread base has properties substantially equivalent to a tire made using a conventional nylon overlay while being made with potentially a great savings in labor and materials.

Further in accordance with the present invention, it has been found that by using a mixture of partially oriented fibers and fibrillated pulp fibers to reinforce an elastomeric matrix, it is possible to control the properties of the elastomeric matrix.

The invention is further illustrated with reference to the following examples.

EXAMPLE 1

This example illustrates a comparison of the physical properties of composites made using 4 phr and 8 phr of POY nylon fibers, and fully oriented nylon fibers in a base formulation.

The following elastomer formulation was used in this and the following examples unless otherwise specified.

| INGREDIENT | phr |
|---|---|
| Polyisoprene | 40 |
| Polybutadiene | 60 |
| Carbon Black | 50 |
| Extender Oil | 10.6 |
| Antidegradant | 5.25 |
| Wax | 0.67 |

-continued

| INGREDIENT | phr |
|---|---|
| Stearic Acid | 1 |
| Zinc Oxide | 3.5 |
| Accelerator | 0.5 |
| Sulfur | 2.25 |
| Total | 173.73 |

The rubber samples were milled to provide orientation of the fibers in the rubber, and samples were prepared and tested wherein the orientation of the fibers was in the direction of milling (with the grain (W)), and perpendicular to the direction of milling (against the grain (A)). The addition of the fibers did not influence cure characteristics of the composites. Other properties, such as dumbbell tensile modulus, Strebler adhesion and cut growth rate were influenced by the fiber addition. The test results are given in Table 1.

In this, and the following tables, IN means initial, AV means average, LD means load, N means Newton, SS means steady state, PK means peak, and EC means entire curve.

TABLE 1

Conventional Physical Properties of Composites Reinforced with Standard and POY Nylon 66 Short Fibers

| | | | | | |
|---|---|---|---|---|---|
| Std Nylon 66 Level | 0 | 4 | 8 | | |
| POY Nylon 66 Level | 0 | | | 4 | 8 |
| Dumbbell Tensile at 20 inches/minute | | | | | |
| W 50% MODULUS, MPA | 0.7 | 3.4 | 5.3 | 2.7 | 4.5 |
| A 50% MODULUS, MPA | 0.7 | 0.7 | 1.1 | 0.7 | 1.2 |
| W 100% MODULUS, MPA | 1.5 | 3.4 | 5.3 | 2.8 | 4.5 |
| A 100% MODULUS, MPA | 1.4 | 1.3 | 1.8 | 1.4 | 2 |
| W 200% MODULUS, MPA | 3.3 | 4.4 | 5.5 | 4 | 5 |
| A 200% MODULUS, MPA | 3.2 | 2.8 | 3.2 | 2.8 | 3.3 |
| W 300% MODULUS, MPA | 6.3 | 6.9 | 7.6 | 6.7 | 7.6 |
| A 300% MODULUS, MPA | 6.1 | 5.3 | 5.4 | 5.2 | 5.5 |
| W TENSILE STRENGTH, MPA | 14.7 | 12.6 | 11.2 | 13 | 11.8 |
| A TENSILE STRENGTH, MPA | 13.3 | 11.3 | 10.5 | 11.2 | 10.8 |
| W ELONGATION, % | 575 | 495 | 435 | 525 | 440 |
| A ELONGATION, % | 535 | 515 | 500 | 525 | 500 |
| Strebler Adhesion to itself at 95° C. | | | | | |
| IN AV LD N | 47.91 | 49.9 | 45.37 | 54.26 | 47.93 |
| SS AV LD N | 54.47 | 52.75 | 46.03 | 55.77 | 52.35 |
| SS PK LD N | 67.27 | 69.33 | 56.71 | 69.94 | 62.75 |
| AV LD EC N | 52.17 | 51.75 | 45.79 | 55.24 | 50.8 |
| | LARGE KNOTTY TEAR NO FIBER VISIBLE | MEDIUM KNOTTY TEAR FIBER VISIBLE | SMALL KNOTTY TEAR FIBER VISIBLE | MEDIUM KNOTTY TEAR FIBER VISIBLE | SMALL KNOTTY TEAR FIBER VISIBLE |

Figure 2:
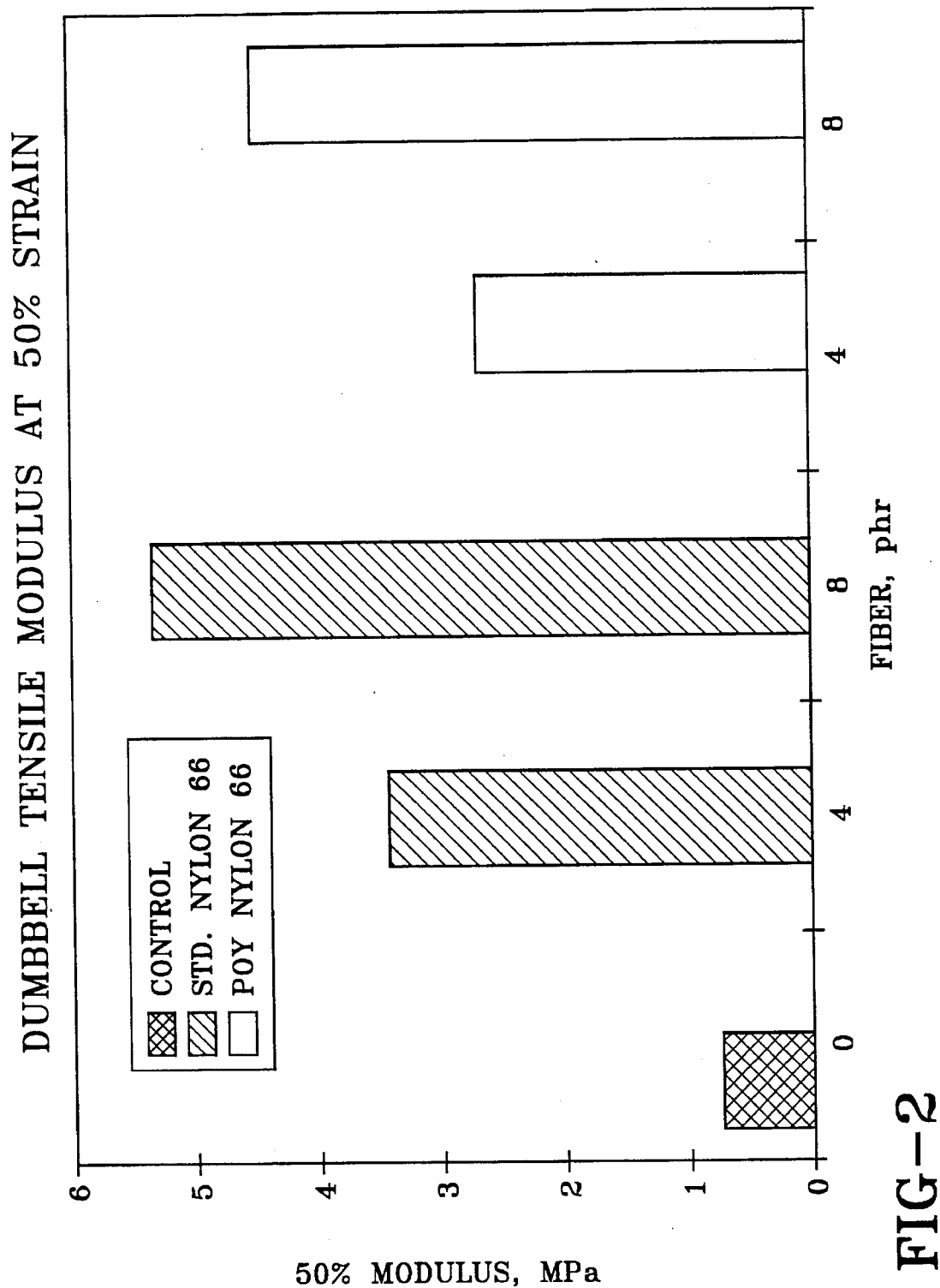
FIG. 2 illustrates the dumbbell tensile modulus of a control elastomer and the same elastomer loaded with POY nylon fibers and standard nylon fibers.

The dumbbell tensile modulus at 50% strain is plotted in FIG. 2. The POY nylon 66 fibers are almost as reinforcing as the standard nylon 6 fibers.

Figure 3:
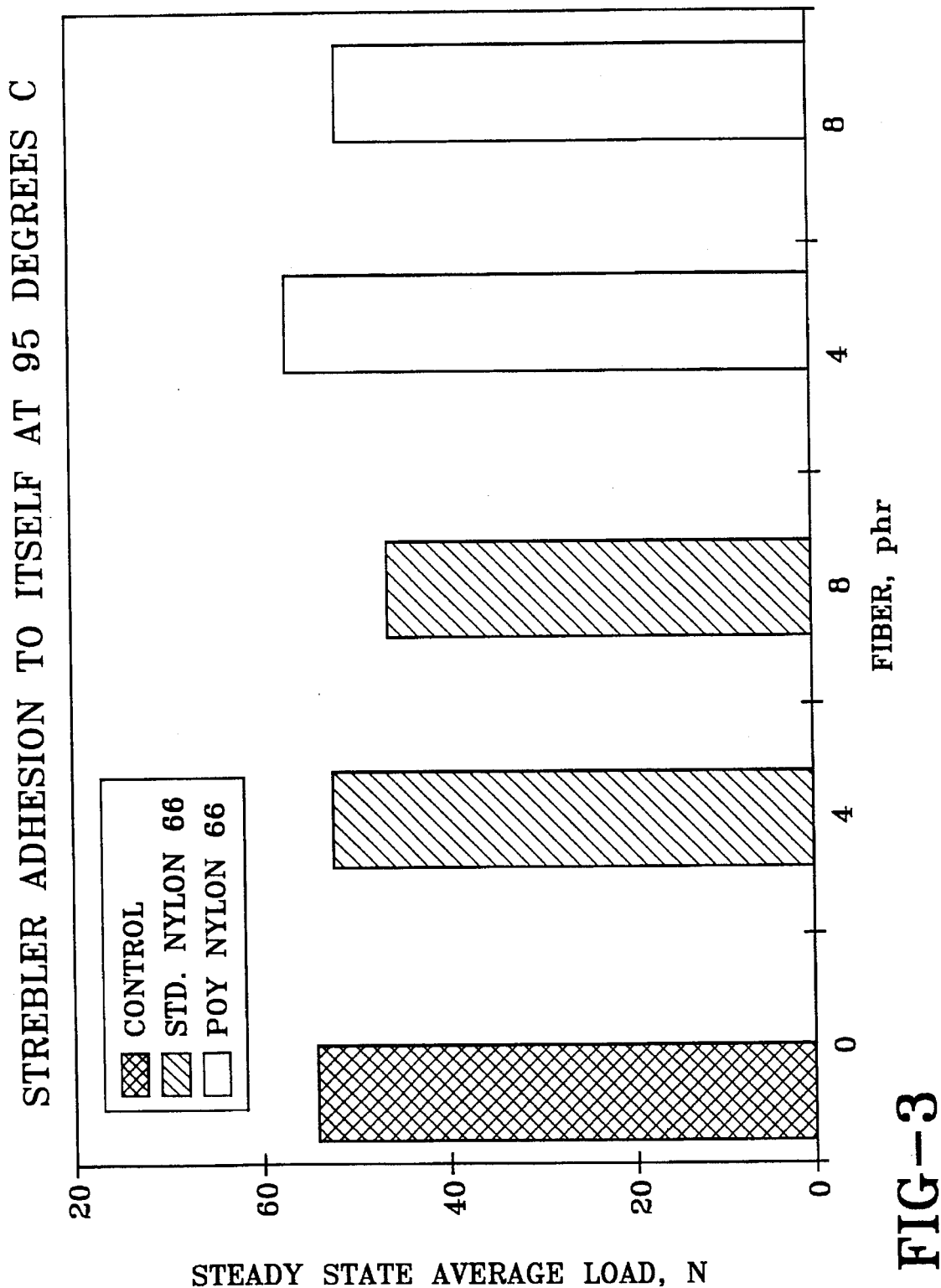
FIG. 3 illustrates the Strebler adhesion of the elastomers of FIG. 2.

The Strebler adhesion to itself at 95° C., a measure of ultimate tear strength, is shown in FIG. 3. The Strebler adhesion typically decreases with the addition of higher levels of fiber. The Strebler adhesion, however, did not decrease significantly with the addition of 8 phr of POY nylon 66 fibers.

Figure 4:
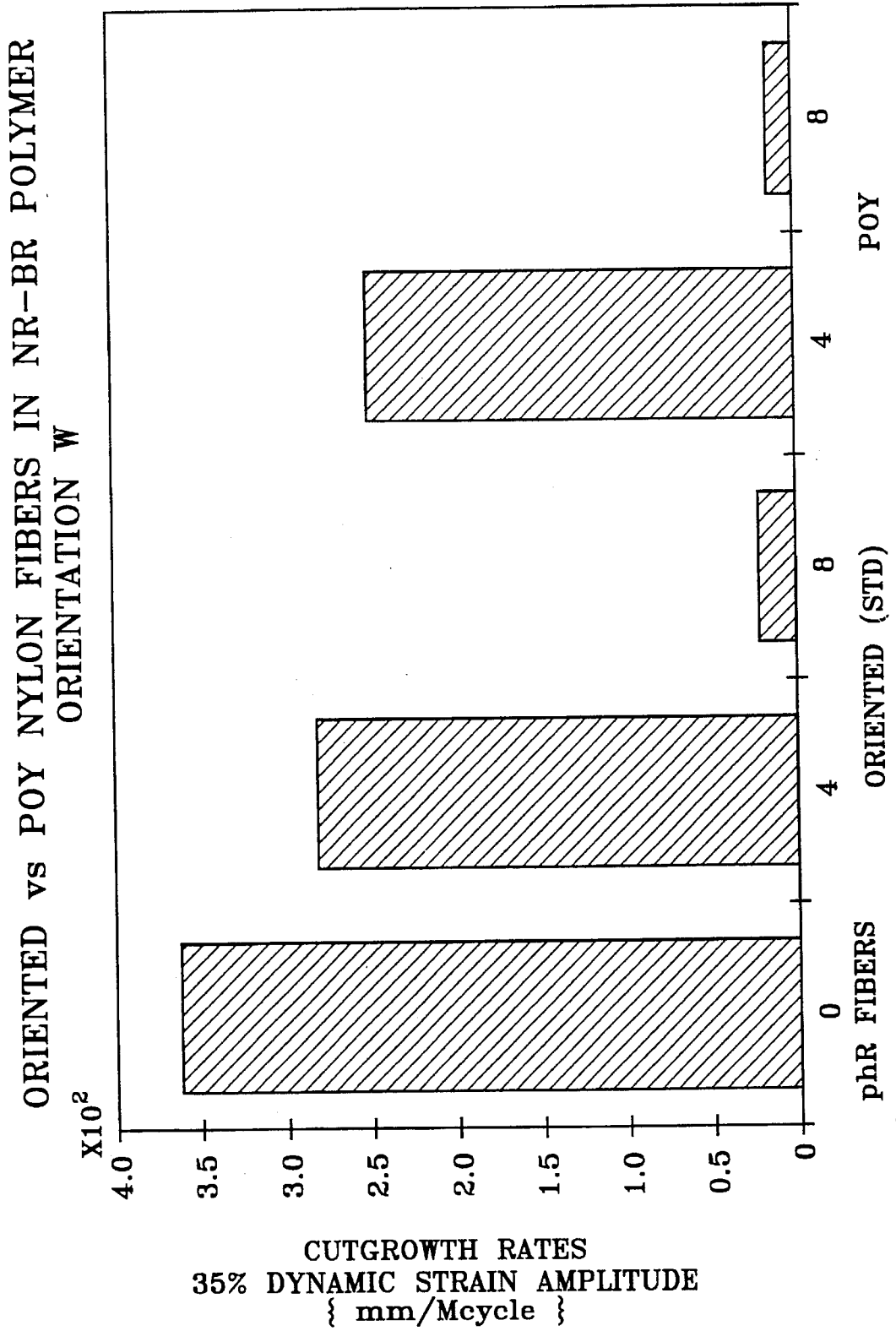
FIG. 4 illustrates cutgrowth rates of oriented (W direction) POY fibers and standard fibers in rubber.
Figure 5:
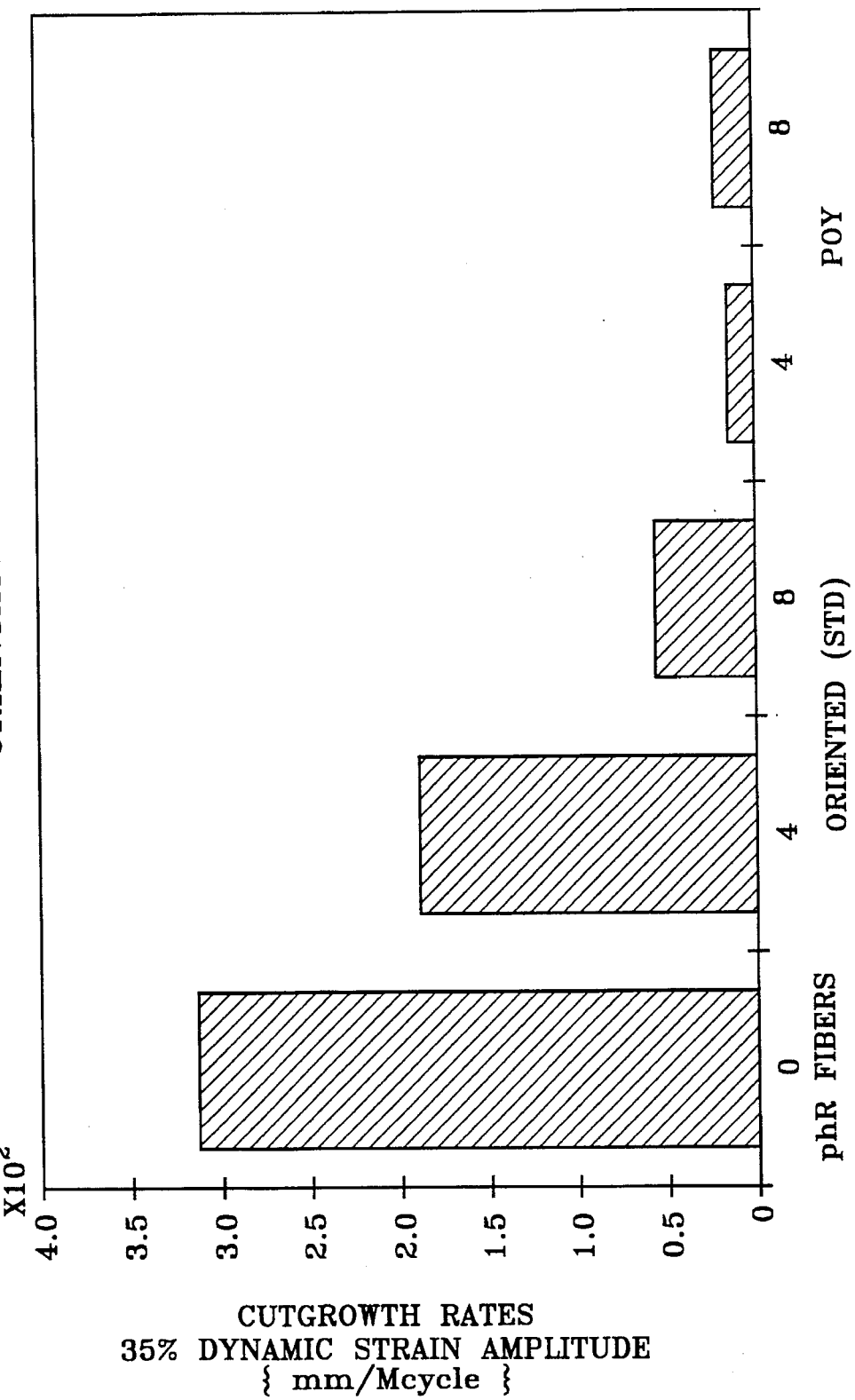
FIG. 5 illustrates cutgrowth rates of oriented (A direction) POY fibers and standard fibers in rubber.

The fracture propagation resistance improved substantially with the addition of fiber and particularly with the addition of POY nylon 66 fibers. As illustrated in FIGS. 4 and 5, the cut growth rates decreased in the W and A directions (with and against the grain) with the best resistance obtained with the POY nylon 66 fibers.

EXAMPLE 2

This example illustrates a comparison of 6 phr of POY nylon 66 fibers and 6 phr of Kevlar® pulp and a mixture of 3 phr POY nylon 66 fibers and 3 phr Kevlar® pulp in a tread base formulation. The rubber samples were prepared as in Example 1.

The addition of the fibers did not influence the cure characteristics of the composites, confirming what was seen in example 1. Other properties that showed a dependency on fiber type are given in Table 2 and FIGS. 6 to 11.

TABLE 2

Conventional Physical Properties of Composites Reinforced with POY Nylon 66 Short Fibers and Aramid Pulp

| POY Nylon 66 Level | 0 | 6 | | 3 |
|---|---|---|---|---|
| Aramid Pulp Level | 0 | | 6 | 3 |
| Dumbbell Tensile at 20 inches/minute | | | | |
| W 50% MODULUS, MPA | 0.86 | 3.63 | 5.53 | 3.46 |
| A 50% MODULUS, MPA | 0.88 | 0.94 | 2.3 | 1.08 |
| W 100% MODULUS, MPA | 1.39 | 3.65 | 5.63 | 3.6 |
| A 100% MODULUS, MPA | 1.37 | 1.43 | 3.08 | 1.65 |
| W 150% MODULUS, MPA | 2.17 | 3.85 | 5.81 | 4.01 |
| A 150% MODULUS, MPA | 2.1 | 1.97 | 3.76 | 2.33 |
| W 200% MODULUS, MPA | 3.27 | 4.51 | 6.24 | 4.78 |
| A 200% MODULUS, MPA | 3.14 | 2.8 | 4.54 | 3.25 |
| W 250% MODULUS, MPA | 4.63 | 5.61 | 7.1 | 5.9 |
| A 250% MODULUS, MPA | 4.47 | 3.9 | 5.47 | 4.37 |
| W 300% MODULUS, MPA | 6.09 | 6.9 | 8.25 | 7.27 |
| A 300% MODULUS, MPA | 5.9 | 5.11 | 6.54 | 5.63 |
| W TENSILE STRENGTH, MPA | 15.29 | 12.19 | 12.11 | 11.53 |
| A TENSILE STRENGTH, MPA | 14.97 | 10.68 | 10.36 | 10.49 |
| W ELONGATION, % | 626 | 499 | 474 | 455 |
| A ELONGATION, % | 610 | 528 | 472 | 495 |

TABLE 2-continued

Conventional Physical Properties of Composites Reinforced with POY Nylon 66 Short Fibers and Aramid Pulp

| Strebler Adhesion to itself at 95° C. | | | | |
|---|---|---|---|---|
| IN AV LD N | 55.83 | 55.46 | 34.28 | 48.95 |
| SS AV LD N | 62.46 | 70.62 | 33.29 | 57.28 |
| SS PK LD N | 76.22 | 84.02 | — | 68.03 |
| AV LD EC N | 60.13 | 65.35 | 33.64 | 54.36 |
| | LARGE KNOTTY TEAR NO FIBER VISIBLE | MEDIUM KNOTTY TEAR FIBER VISIBLE | SMALL KNOTTY TEAR FIBER VISIBLE | MEDIUM KNOTTY TEAR FIBER VISIBLE |

Figure 6:
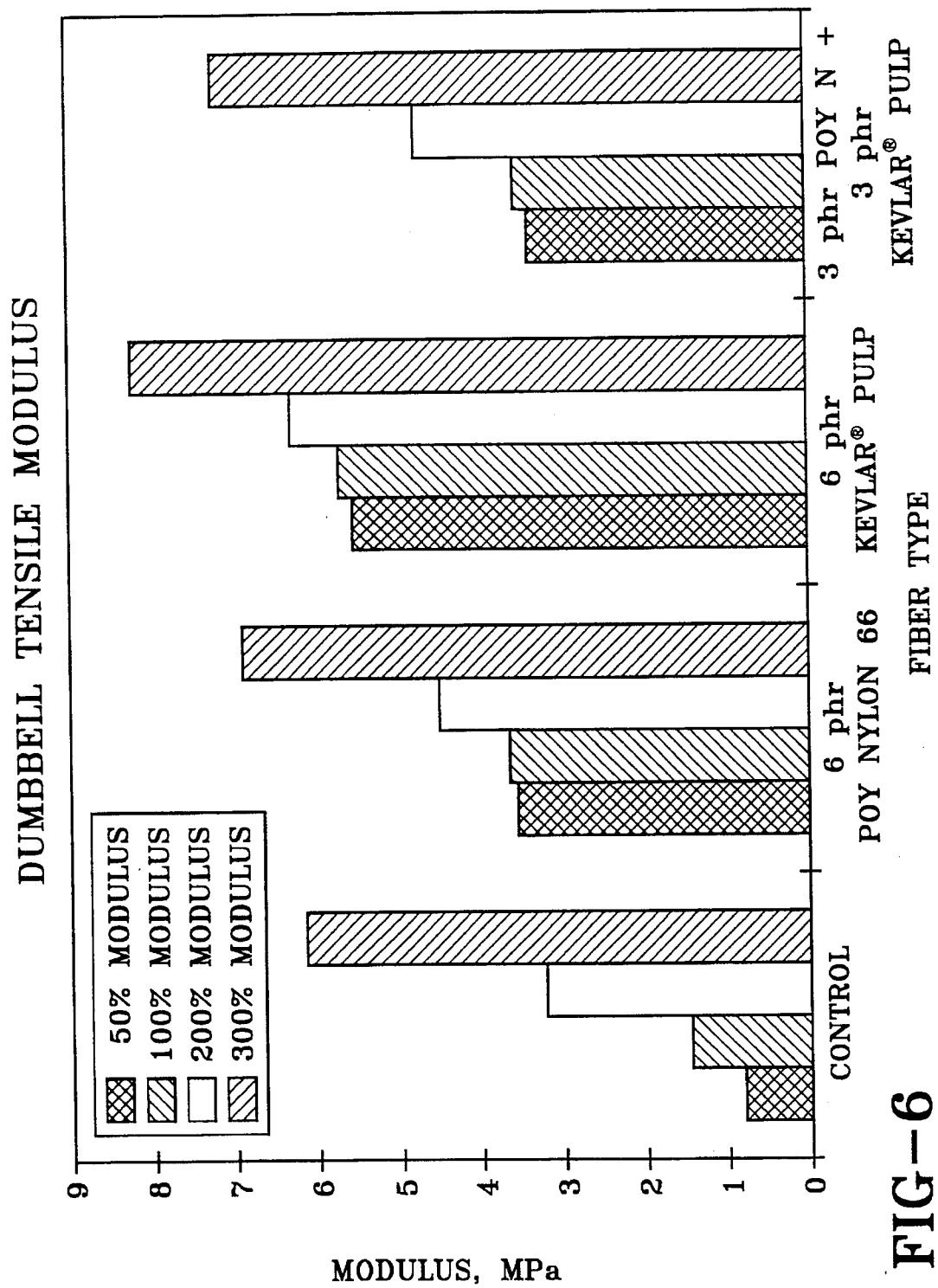
FIG. 6 illustrates dumbbell tensile modulus of POY fibers, aramid fibers, and a combination of POY fibers and aramid fibers in rubber.
Figure 7:
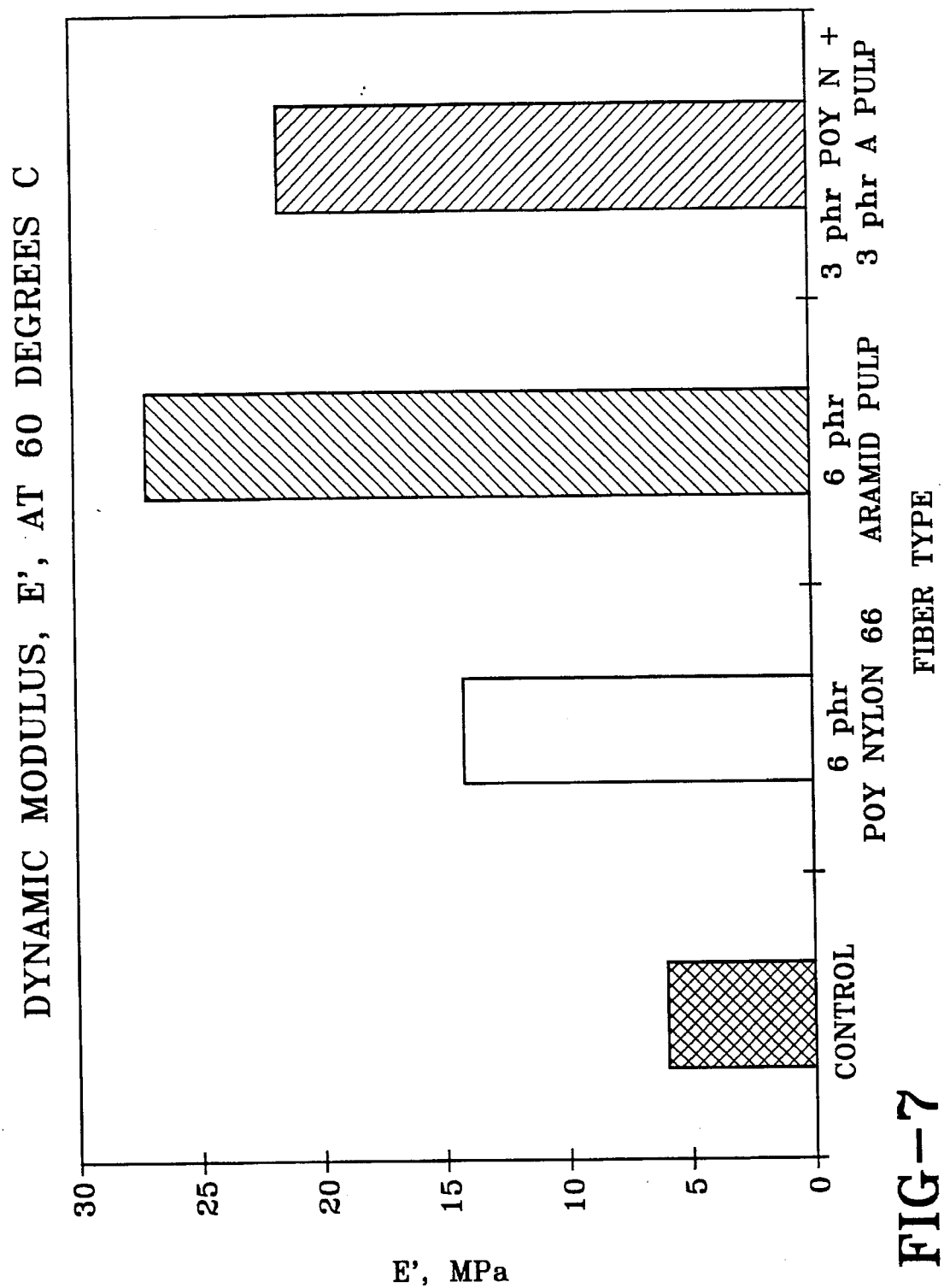
FIG. 7 illustrates the dynamic modulus of the composites illustrated in FIG. 6.

The dumbbell modulus at several strain levels is plotted in FIG. 6. Dynamic tensile and shear data are plotted in FIGS. 7 and 8. The highest composite stiffness is achieved with 6 phr of the Kevlar® pulp. The stiffness of the composite containing 6 phr of POY nylon 66 fibers can be matched or enhanced using a mixture of 3 phr POY nylon 66 fibers and 3 phr Kevlar® pulp.

The Strebler adhesion to itself at 95° C. is plotted in FIG. 9. The highest stiffness material, the composite containing 6 phr of Kevlar® pulp, exhibits the lowest cohesive tear strength. Substituting 3 phr of Kevlar® pulp with 3 phr POY nylon 66 returns the tear strength to the level of the fiber free compound.

The ultimate tear strength was also assessed by measuring catastrophic tearing energy and ultimate elongation and is presented in FIG. 10. The results parallel the Strebler adhesion data.

The fracture propagation, shown in FIG. 11, illustrates that the highest stiffness material, the composite reinforced with 6 phr Kevlar® pulp, has the worst fracture resistance. The composite with 6 phr POY nylon 66 fibers has a fracture resistance superior to the control. A balance of properties can be obtained with the combination of 3 phr POY nylon 66 fibers and 3 phr Kevlar® pulp.

From the results of examples 1 and 2, it can be concluded that the hybrid POY nylon 66/Kevlar® pulp composites provide a means to the engineer to balance stiffness properties of the Kevlar® pulp with the ultimate tear strength and fracture propagation resistance properties of the POY nylon 66 fibers. These results can be obtained in a range of fiber levels acceptable for mixing and processing of the composite.

EXAMPLE 3

Composite laminates simulating the belt structure of a radial tire were built in the laboratory, and their fatigue strength measured in a load control mode in a closed-loop, servohydraulic tester.

When angle-plied composite belt laminates are submitted to cyclic tensile loading, interply shearing stresses are developed leading to edge cracking and eventually to delamination failure.

The results of fatigue experiments are summarized in Tables 3 and 4 for steel wire belt composites and aramid cord belt composites, respectively.

The modified wire belt composite structure was made of a two-ply, (2+2)×0.25 mm, 20 epi, ±23° natural rubber laminate, and an additional ply of tread base compound reinforced with a hybrid mixture of 3 phr POY nylon 66 and 3 phr Kevlar® pulp short fibers, oriented in the direction of the laminate long axis (0°).

The modified aramid cord belt composite structure was made of a two-ply, 1500/2, 20 epi, ±23° natural rubber laminate, with an additional ply of tread base compound reinforced with a hybrid mixture of 3 phr POY nylon 66 and 3 phr Kevlar® pulp short fibers, oriented in the direction of the laminate long axis (0°). The meaning of this nomenclature is the following: 1500 is the ply denier; 2 is the number of plies in the cord; epi is the number of cords or ends per inch of the composite and 23° is the angle the cords make with the long axis of the composite.

TABLE 3

Fatigue Resistance of Steel Wire Belt Composites
Tension/Tension Fatigue
Room Temperature
Minimum Load: 114 lb/in width
Frequency: 10 Hz
Number of Cycles to Failure

| Maximum Load (lb/in width) | Standard Belt Construction (1) (Control) | Modified Belt Construction (2) |
| --- | --- | --- |
| 700 | 4,990 | 16,100 |
| 600 | 33,020 | 169,400 |
| 580 | 43,000 | 439,000 |
| 510 | 322,450 | No Failure |
| 490 | 824,000 | No Failure |
| 470 | No Failure | No Failure |

(1.) Belt laminate: 2 + 2 × 0.25 mm wire cord; 20 epi; ± 23° angle. All natural rubber coat stock.
(2.) Same as (1) but with soft rubber layer (tread base compound/natural & synthetic rubber blends as in formulation previously described) reinforced with 3 phr POY nylon 66 and 3 phr Kevlar ® pulp. Short fibers oriented in direction of laminate long axis (0°).

TABLE 4

Fatigue Resistance of Aramid Cord Belt Composites
Tension/Tension Fatigue
Room Temperature
Minimum Load: 114 lb/in width
Frequency: 10 Hz
Number of Cycles to Failure

| Maximum Load (lb/in width) | Standard Belt Construction (1) (Control) | Modified Belt Construction (2) |
| --- | --- | --- |
| 720 | 3,960 | 10,035 |
| 540 | 75,400 | 247,400 |
| 510 | 139,000 | 264,500 |
| 470 | 475,000 | No Failure |
| 430 | No Failure | No Failure |

(1.) Belt laminate: 1500/2 aramid cord; 20 epi; ± 23° angle. All natural rubber coat stock.
(2.) Same as 1 but with a soft rubber layer (tread base compound) reinforced with 3 phr POY nylon and 3 phr Kevlar ® pulp. Short fibers oriented in direction of laminate long axis (0°).

The data contained in Tables 3 and 4 show that the modified belt constructions have in all cases higher fatigue life than the standard belt construction, under cyclic tension loading, at a constant minimum load, over the whole range of maximum loads investigated.

While the invention has been variously illustrated and described, those skilled in the art will recognize that the invention can be variously modified and practiced without departing from the spirit of the invention.

What is claimed is:

1. A pneumatic tire having a tread base comprising a vulcanizable elastomeric matrix material having dispersed therein 4 to 8 phr partially oriented fibers having a modulus of less than 10 GPa, said partially oriented fibers having a length of about 0.2 to 12 mm, a diameter of about 0.005 to 0.03 mm and an aspect ratio of 25 to 1000, said fibers being selected from the group consisting of polyamides, polyesters and polyolefins, and wherein said elastomer matrix material with said fibers has a tensile modulus at 50% elongation of 2.5 to 5 MPa, a cut growth rate of 4 to $6 \times 10^2$ mm/Mc, a hysteresis of 1.75 to $1.85 \times 10^2$ KPa, a tensile strength of 11 to 15 MPa, an ultimate elongation of 400 to 600%, and a Shore A hardness of 53 to 68.

2. The tire according to claim 1 wherein said partially oriented fibers comprise about 4 to about 8 parts by weight per 100 parts by weight of said vulcanizable elastomeric matrix material.

3. The tire according to claim 1 wherein said partially oriented fiber has a modulus of less than about 6 GPa.

4. The composition according to claim 1 wherein said partially oriented fiber has a modulus of about 2 GPa.

5. The tire according to claim 1 in which said vulcanizable elastomeric matrix material is selected from the group consisting of natural rubber/polybutadiene rubber, polyisoprene, styrene butadiene rubber, butyl rubber, and mixtures and blends thereof.

6. The tire according to claim 1 wherein said partially oriented fibers are selected from the group consisting of polyamide, polyester, polyolefin and mixtures thereof.

7. A pneumatic tire having a tread base comprising a cured elastomeric matrix having dispersed therein 0.5 to 6 phr partially oriented fibers and 0.5 to 8 phr fibrillated pulp fibers, said partially oriented fibers having a modulus of less than 10 GPa, a length of about 0.2 to 12 mm, a diameter of about 0.005 to 0.03 mm and an aspect ratio of 25 to 1000, said partially oriented fibers being selected from the group consisting of polyamides, polyesters and polyolefins, and said fibrillated pulp fibers having a length of about 0.2 to 5 mm, a diameter of about 0.0005 to 0.02 mm and an aspect ratio of 25 to 1000, said fibrillated pulp fiber being selected from the group consisting of aromatic copolyester, p-aramid, liquid crystalline cellulosic fibers, rigid rod aromatic heterocyclic liquid crystalline fibers, gel spun fibers, wet spun acrylic fibers, superoriented aromatic copolyamide fibers and mixtures thereof, and wherein said elastomer matrix material with said fibers has a tensile modulus at 50% elongation of 1 to 7 MPa, a cut growth rate of 1 to $10 \times 10^2$ mm/Mc, a hysteresis of 1.5 to $3 \times 10^2$ KPa, a tensile strength of 9 to 15 MPa, an ultimate elongation of 300 to 600%, and a Shore A hardness of 52 to 70.

8. The tire according to claim 7 wherein said partially oriented fibers comprise about 0.5 to 10 phr, and said fibrillated pulp fibers comprise about 0.5 to 8 phr of said elastomeric material, wherein the total amount of the fiber reinforcement is about 1–14 phr.

9. The tire according to claim 7 wherein said partially oriented fiber has a modulus of less than about 6 GPa.

10. The tire according to claim 7 wherein said partially oriented fiber has a modulus of about 2 GPa.

11. The tire according to claim 7 which comprises 3 phr POY fibers and 3 phr fibrillated pulp fibers.

12. The tire according to claim 7 wherein said partially oriented fibers are selected from the group consisting of aliphatic polyamide, polyester, polyolefin and mixtures thereof.

13. The tire according to claim 7 wherein said partially oriented fiber has a modulus of less than about 6 GPa.

14. The tire according to claim 7 wherein said partially oriented fiber has a modulus of about 2 GPa.

* * * * *